(12) United States Patent
Corlett

(10) Patent No.: US 10,462,386 B2
(45) Date of Patent: Oct. 29, 2019

(54) VIRTUAL FOCUS FEEDBACK

(71) Applicant: Microsoft Technology Licensing, LLC, Redmond, WA (US)

(72) Inventor: Barry Corlett, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 406 days.

(21) Appl. No.: 14/562,292

(22) Filed: Dec. 5, 2014

(65) Prior Publication Data

US 2016/0165151 A1 Jun. 9, 2016

(51) Int. Cl.
| | |
|---|---|
| *H04N 5/33* | (2006.01) |
| *G06T 1/20* | (2006.01) |
| *G02B 27/01* | (2006.01) |
| *G03B 13/36* | (2006.01) |
| *H04N 5/232* | (2006.01) |

(52) U.S. Cl.
CPC ............ *H04N 5/33* (2013.01); *G02B 27/017* (2013.01); *G03B 13/36* (2013.01); *G06T 1/20* (2013.01); *H04N 5/23212* (2013.01); *H04N 5/23222* (2013.01); *H04N 5/23293* (2013.01); *G02B 2027/0178* (2013.01)

(58) Field of Classification Search
CPC ... H04N 5/23212; H04N 5/23293; H04N 5/33
See application file for complete search history.

(56) References Cited

U.S. PATENT DOCUMENTS

| | | | |
|---|---|---|---|
| 6,753,919 B1 * | 6/2004 | Daugman | .......... G06K 9/00597 348/345 |
| 7,542,210 B2 | 6/2009 | Chirielseison, Sr. | |
| 8,194,995 B2 | 6/2012 | Wong et al. | |
| 8,466,422 B2 | 6/2013 | Johnson et al. | |
| 8,508,652 B2 | 8/2013 | Albu et al. | |
| 8,599,264 B2 | 12/2013 | Schmidt | |
| 8,654,239 B2 | 2/2014 | Bergqvist et al. | |

(Continued)

FOREIGN PATENT DOCUMENTS

| | | |
|---|---|---|
| CN | 101067710 A | 11/2007 |
| CN | 102591016 A | 7/2012 |

(Continued)

OTHER PUBLICATIONS

Written Opinion of the International Preliminary Examining Authority dated Oct. 26, 2016, International Application No. PCT/US2015/062849.

(Continued)

*Primary Examiner* — Anand S Rao
*Assistant Examiner* — Tyler B Edwards
(74) *Attorney, Agent, or Firm* — Arent Fox LLP

(57) ABSTRACT

A system and method for focusing a camera is disclosed. The system may generate a proxy image that is blurred to an extent that is correlated to a degree to which a camera is out of focus. A user may be asked to adjust a focusing mechanism to attempt to bring the proxy image into focus. This allows the camera to be focused without the user needing to see an image from the camera. This can be used, for example, to focus an infrared camera. The infrared camera could be a tracking camera in a device such as a head mounted display device.

20 Claims, 13 Drawing Sheets

(56) References Cited

U.S. PATENT DOCUMENTS

| | | | |
|---|---|---|---|
| 2003/0117511 A1* | 6/2003 | Belz | H04N 1/0044 348/333.11 |
| 2009/0074393 A1 | 3/2009 | Park et al. | |
| 2012/0127062 A1* | 5/2012 | Bar-Zeev | G02B 3/14 345/6 |
| 2013/0182152 A1 | 7/2013 | Li | |
| 2013/0207887 A1 | 8/2013 | Raffle | |

FOREIGN PATENT DOCUMENTS

| | | |
|---|---|---|
| DE | 102010019399 A1 | 11/2011 |
| EP | 1811771 A1 | 7/2007 |
| JP | 2012181362 A | 9/2012 |
| WO | WO00/33569 A1 | 6/2000 |

OTHER PUBLICATIONS

Amendment dated Apr. 12, 2016, International Application No. PCT/US2015/062849.

International Search Report & The Written Opinion of the International Searching Authority dated Mar. 1, 2015, International Application No. PCT/US2015/062849.

Kim, et al., "Highlighted Depth-of-Field Photography: Shining Light on Focus", In Journal of ACM Transactions on Graphics(TOG), vol. 30, Issue 3, May 1, 2011, 9 pages.

Kim, et al., "Simultaneous Out-Of-Focus Blur Estimation and Restoration for Digital Auto-Focusing System", IEEE Transactions on Consumer Electronics, vol. 44, Issue 3, Aug. 1998, pp. 1071-1075.

Yahyanejad, Saeed, et al., "Lens Distortion Correction for Thermal Cameras to Improve Aerial Imaging with Small-Scale UAVs," IEEE International Symposium on Robotic and Sensors Environments, Sep. 17, 2011, 6 pages.

Hillaire, Sebastien, et al., "Using an Eye-Tracking System to Improve Camera Motions and Depth-of-Field Blur Effects in Virtual Environments," IEEE Virtual Reality Conference, Mar. 8, 2008, 4 pages.

Kreylos, Oliver, "An Eye-tracked Oculus Rift," [downloaded from http://doc-ok.org/?p=1021], Jun. 2, 2014, 16 pages.

"ITU Gaze Tracker—A brief users guide," IT University of Copenhagen, v1.0b, [http://www.gazegroup.org/software/GT_Users_Guide.pdf), Dec. 29, 2009, 9 pages.

"Tobii TX300 Eye Tracker," Tobii Technology, [downloaded from http://www.tobii.com/Global/Analysis/Downloads/Product_Descriptions/Tobii_TX300_EyeTracker_Product_Description_pdf?epslanguage=en], Jun. 5, 2014, 18 pages.

English Abstract of Japanese Publication No. JP20110044285 dated Sep. 20, 2012.

"International Preliminary Report on Patentability Issued in PCT Application No. PCT/US2015/062849", dated Mar. 15, 2017, 9 Pages.

Response to Office Action dated Aug. 16, 2017, European Patent Application No. 15816295.8.

"First Office Action and Search Report Issued in Chinese Patent Application No. 201580066112.X", dated May 7, 2019, 17 pages (MS# 341700-CN-PCT).

* cited by examiner

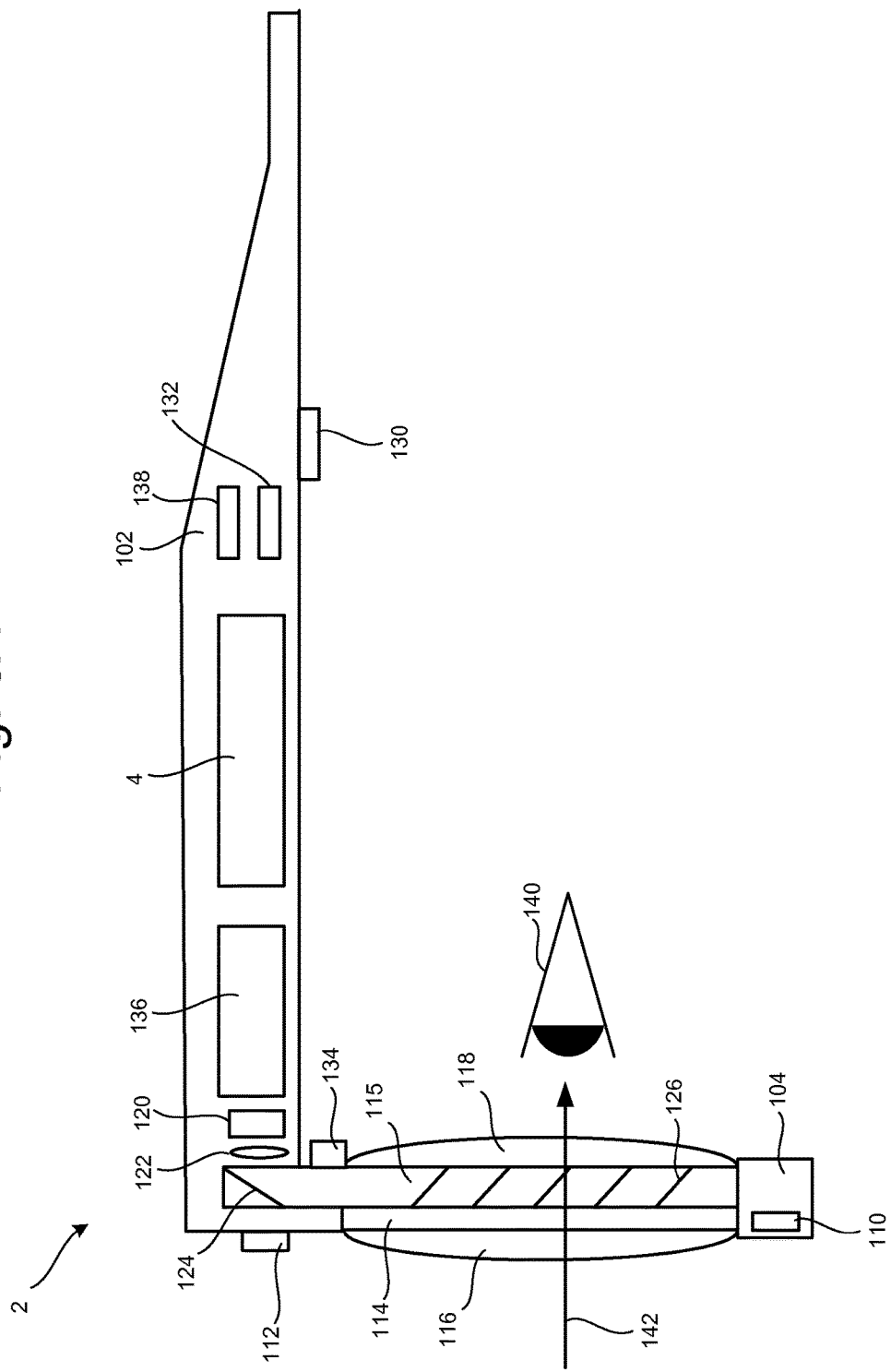

VIRTUAL FOCUS FEEDBACK

BACKGROUND

In optical systems that require focusing, the positioning of a focusing mechanism directly results in a change in the focus of the transferred image. In systems that are manually focused, the user adjusts the focusing element until the focus of the image achieves the desired state. Auto focus systems strive to achieve a similar goal by using a range finder or by measuring the degree of focus of the image.

Problems still exist in focusing optical systems.

SUMMARY

Embodiments of the present technology relate to a system and method for focusing a camera. In one embodiment, the camera is in a head mounted display device that includes display units and an eye position and tracking assembly. The display units display images to optics over the left and right eyes. The eye position and tracking assembly may include one or more light sources and one or more cameras. Techniques are disclosed for focusing the one or more cameras in the HMD. The techniques are not limited to focusing cameras in an HMD In one embodiment, processing logic in communication with a display and a camera receives data associated with the camera and determines a degree to which the camera is in focus based on the data. The processing logic generates a proxy image that has a degree of blurring that inversely correlates with the degree to which the camera is in focus and displays the proxy image on the display. A user is instructed to adjust a camera focus mechanism to better focus the proxy image.

An alternative embodiment includes the following. Data associated with a camera is received. A degree to which the camera is in focus is determined based on the received data. A proxy image is generated that has a degree of blurring that inversely correlates with the degree to which the camera is in focus. The proxy image is displayed on a display screen. The foregoing is repeated, which includes receiving updated data associated with the camera, determining a new degree to which the camera is in focus, and modifying the degree of blurring of the proxy image to inversely correlate with the new degree of focus of the camera.

Another embodiment includes a head mounted display (HMD), comprising a near-eye, see-through display, an infrared (IR) camera, and a processor in communication with the infrared camera and the near-eye, see-through display. The processor receives an infrared image from the IR camera and determines a degree to which the infrared image is out of focus. The processor blurs a base image to create a proxy image that has a degree of blurring that correlates with the degree to which the infrared image is out of focus. The processor displays the proxy image on the near-eye, see-through display. The processor receives a new infrared image from the IR camera after displaying the proxy image and determines a new degree to which the infrared image is out of focus. The processor modifies the degree of blurring of the proxy image to correlate with the new degree to which the infrared image is out of focus. The processor displays an updated proxy image based on the modified degree of blurring.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 3A is a side view of a portion of one embodiment of a head mounted display unit.

DETAILED DESCRIPTION

Embodiments of the present technology will now be described which in general relate to a system and method for focusing a camera. In one embodiment, the system generates a proxy image that is blurred to an extent that is correlated to a degree to which a camera is out of focus. The user may be asked to adjust a focusing mechanism to attempt to bring the proxy image into focus. This allows the camera to be focused without the user needing to see an image from the camera. This can be used, for example, to focus an infrared camera. The infrared camera could be a tracking camera in a device such as a head mounted display device.

The head mounted display device may include a display element. The display element is to a degree transparent so that a user can look through the display element at real world objects within the user's field of view (FOV). The display element also provides the ability to project virtual images into the FOV of the user such that the virtual images may also appear alongside the real world objects. The system automatically tracks where the user is looking so that the system can determine where to insert the virtual image in the FOV of the user. Once the system knows where to project the virtual image, the image is projected using the display element.

The head mounted display device may be used to implement a mixed reality environment including real and virtual objects. Mixed reality is a technology that allows holographic, or virtual, imagery to be mixed with a real world physical environment. A see-through, head mounted, mixed reality display device may be worn by a user to view the mixed imagery of real objects and virtual objects displayed in the user's field of view. In order to facilitate the illusion of three-dimensional depth, images of virtual objects are displayed independently to the left and right eyes by the head mounted display device with a small binocular disparity between the images. This binocular disparity is interpreted by the brain as indicative of a depth of the virtual object in the mixed reality environment.

Figure 1:
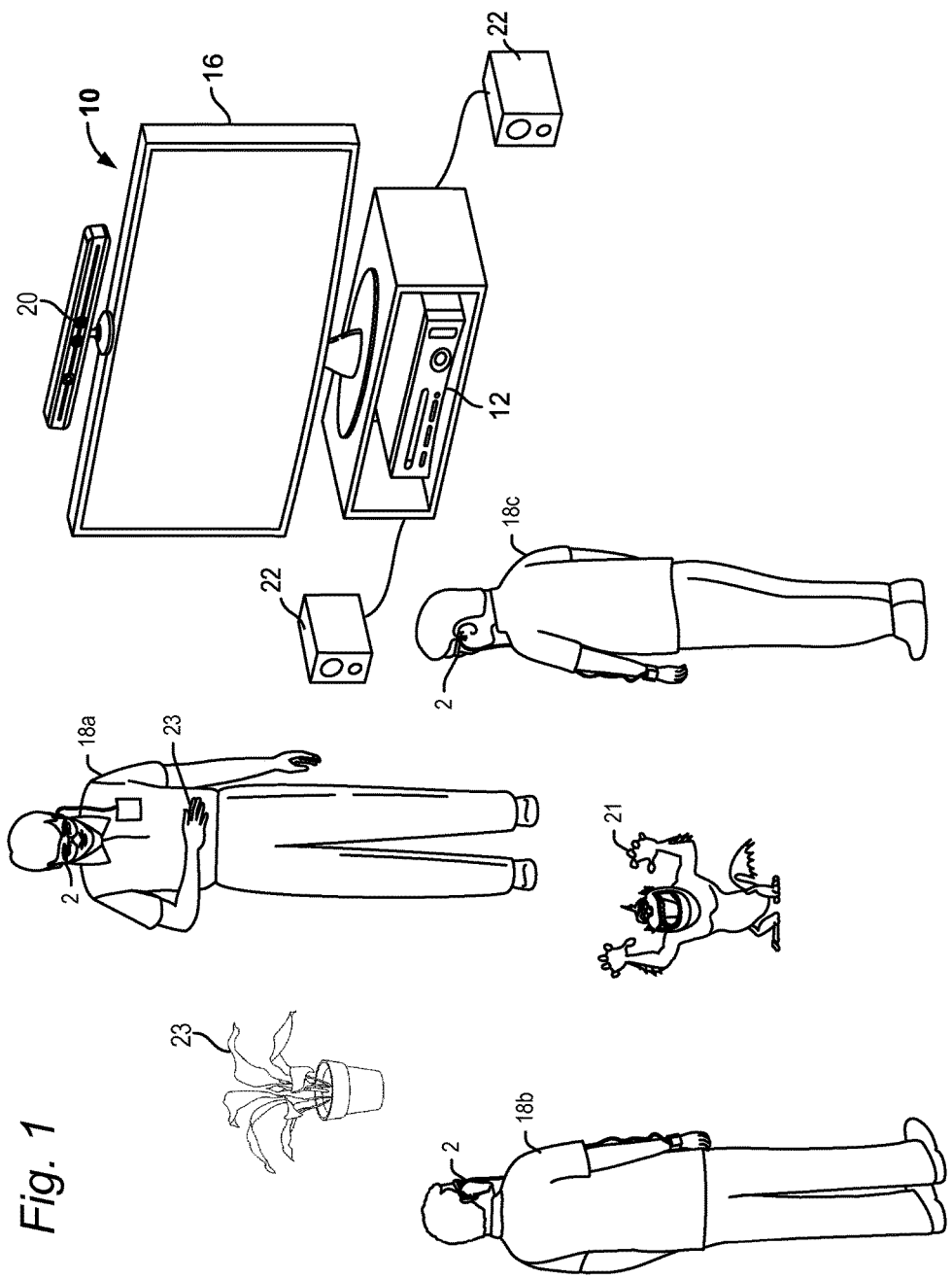
FIG. 1 is an illustration of example components of one embodiment of a system for presenting a mixed reality environment to one or more users.
Figure 2:
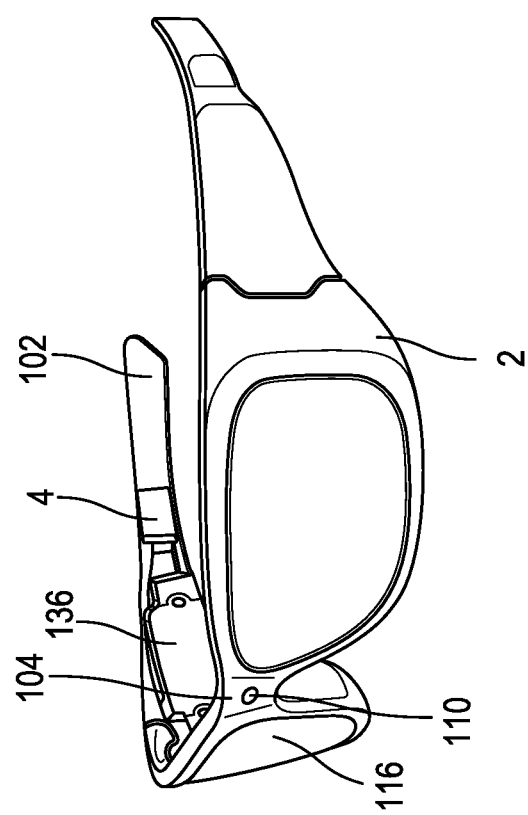
FIG. 2 is a perspective view of one embodiment of a head mounted display unit.

FIG. 1 illustrates a system 10 for providing a mixed reality experience by fusing virtual object 21 with real content within a user's FOV. FIG. 1 shows a multiple users 18a, 18b, 18c, each wearing a head mounted display device 2 for viewing virtual objects such as virtual object 21 from own perspective. There may be more or fewer than three users in further examples. As seen in FIGS. 2 and 3, a head mounted display device 2 may include an integrated processing unit 4. In other embodiments, the processing unit 4 may be separate from the head mounted display device 2, and may communicate with the head mounted display device 2 via wired or wireless communication.

Head mounted display device 2, which in one embodiment is in the shape of glasses, is worn on the head of a user so that the user can see through a display and thereby have an actual direct view of the space in front of the user. The use of the term "actual direct view" refers to the ability to see the real world objects directly with the human eye, rather than seeing created image representations of the objects. For example, looking through glass at a room allows a user to have an actual direct view of the room, while viewing a video of a room on a television is not an actual direct view of the room. More details of the head mounted display device 2 are provided below.

The processing unit 4 may include much of the computing power used to operate head mounted display device 2. In embodiments, the processing unit 4 communicates wirelessly (e.g., WiFi, Bluetooth, infra-red, or other wireless communication means) to one or more hub computing systems 12. As explained hereinafter, hub computing system 12 may be provided remotely from the processing unit 4, so that the hub computing system 12 and processing unit 4 communicate via a wireless network such as a LAN or WAN. In further embodiments, the hub computing system 12 may be omitted to provide a mobile mixed reality experience using the head mounted display devices 2 and processing units 4.

The head mounted display device 2, either by itself or in conjunction with the hub computing system 12, may provide a mixed reality experience where one or more virtual images, such as virtual object 21 in FIG. 1, may be mixed together with real world objects in a scene. FIG. 1 illustrates examples of a plant 23 or a user's hand 23 as real world objects appearing within the user's FOV.

FIGS. 2 and 3A show perspective and side views of the head mounted display device 2. FIG. 3A shows the right side of head mounted display device 2, including a portion of the device having temple 102 and nose bridge 104. Built into nose bridge 104 is a microphone 110 for recording sounds and transmitting that audio data to processing unit 4, as described below. At the front of head mounted display device 2 is room-facing video camera 112 that can capture video and still images. Those images are transmitted to processing unit 4, as described below.

A portion of the frame of head mounted display device 2 will surround a display (that includes one or more lenses). In order to show the components of head mounted display device 2, a portion of the frame surrounding the display is not depicted. The display includes a light-guide optical element 115, opacity filter 114, see-through lens 116 and see-through lens 118. In one embodiment, opacity filter 114 is behind and aligned with see-through lens 116, light-guide optical element 115 is behind and aligned with opacity filter 114, and see-through lens 118 is behind and aligned with light-guide optical element 115. See-through lenses 116 and 118 are standard lenses used in eye glasses and can be made to any prescription (including no prescription). Light-guide optical element 115 channels artificial light to the eye.

Control circuits 136 provide various electronics that support the other components of head mounted display device 2. More details of control circuits 136 are provided below with respect to FIG. 4. Inside or mounted to temple 102 are ear phones 130, inertial measurement unit 132 and temperature sensor 138. In one embodiment shown in FIG. 4, the inertial measurement unit 132 (or IMU 132) includes inertial sensors such as a three axis magnetometer 132A, three axis gyro 132B and three axis accelerometer 132C. The inertial measurement unit 132 senses position, orientation, and sudden accelerations (pitch, roll and yaw) of head mounted display device 2. The IMU 132 may include other inertial sensors in addition to or instead of magnetometer 132A, gyro 132B and accelerometer 132C.

Microdisplay 120 projects an image through lens 122. There are different image generation technologies that can be used to implement microdisplay 120. For example, microdisplay 120 can be implemented in using a transmissive projection technology where the light source is modulated by optically active material, backlit with white light. These technologies are usually implemented using LCD type displays with powerful backlights and high optical energy densities. Microdisplay 120 can also be implemented using a reflective technology for which external light is reflected and modulated by an optically active material. The illumination is forward lit by either a white source or RGB source, depending on the technology. Digital light processing (DLP), liquid crystal on silicon (LCOS) and Mirasol® display technology from Qualcomm, Inc. are all examples of reflective technologies which are efficient as most energy is reflected away from the modulated structure and may be used in the present system. Additionally, microdisplay 120 can be implemented using an emissive technology where light is generated by the display. For example, a PicoP™ display engine from Microvision, Inc. emits a laser signal with a micro mirror steering either onto a tiny screen that acts as a transmissive element or beamed directly into the eye (e.g., laser).

Light-guide optical element 115 transmits light from microdisplay 120 to the eye 140 of the user wearing head mounted display device 2. Light-guide optical element 115 also allows light from in front of the head mounted display device 2 to be transmitted through light-guide optical element 115 to eye 140, as depicted by arrow 142, thereby allowing the user to have an actual direct view of the space in front of head mounted display device 2 in addition to receiving a virtual image from microdisplay 120. Thus, the walls of light-guide optical element 115 are see-through. Light-guide optical element 115 includes a first reflecting surface 124 (e.g., a mirror or other surface). Light from microdisplay 120 passes through lens 122 and becomes incident on reflecting surface 124. The reflecting surface 124 reflects the incident light from the microdisplay 120 such that light is trapped inside a planar substrate comprising light-guide optical element 115 by internal reflection. After several reflections off the surfaces of the substrate, the trapped light waves reach an array of selectively reflecting surfaces 126. Note that one of the five surfaces is labeled 126 to prevent over-crowding of the drawing. Reflecting surfaces 126 couple the light waves incident upon those reflecting surfaces out of the substrate into the eye 140 of the user.

In accordance with aspects of the present technology, the head mounted display device 2 may also include a system for locating and tracking the position of the user's eyes. This system includes an eye position and tracking assembly 134 (FIG. 3A), which has an eye tracking illumination device 134A and eye tracking sensor 134B (FIG. 4). In one embodiment, eye tracking illumination device 134A includes one or more infrared (IR) emitters, which emit IR light toward the eye. In one embodiment, eye tracking sensor 134B includes one or more cameras that sense the reflected IR light. Alternatively, eye tracking sensor 134B may be an RGB or depth sensor. There may be multiple sensors 134B in embodiments.

The position of a user's eyes, and the pupils within the eyes, can be identified by known imaging techniques which detect the reflection of the cornea. Such a technique can locate a position of the center of the eye relative to the tracking sensor 134B. In embodiments, there may be a separate eye position and tracking assembly 134 for each of the left and right eyes so that a user's IPD may be determined. In further embodiments, there may be a single eye position and tracking assembly 134 identifying the center of either the left or right eye.

In one embodiment, the system will use four IR LEDs and four IR photo detectors in rectangular arrangement so that there is one IR LED and IR photo detector at each corner of the lens of head mounted display device 2. Light from the LEDs reflect off the eyes. The amount of infrared light detected at each of the four IR photo detectors determines a position of the eye relative to the sensor 134B, as well as the pupil direction. In particular, the amount of white versus black in the eye will determine the amount of light reflected off the eye for that particular photo detector. Thus, the photo detector will have a measure of the amount of white or black in the eye. From the four samples, the system can determine the direction of the eye.

Another alternative is to use four infrared LEDs as discussed above, but one infrared CCD on the side of the lens of head mounted display device 2. The CCD will use a small mirror and/or lens (fish eye) such that the CCD can image up to 75% of the visible eye from the glasses frame. The CCD will then sense an image and use computer vision to find the image, much like as discussed above. Thus, although FIG. 3 shows one assembly with one IR transmitter, the structure of FIG. 3 can be adjusted to have four IR transmitters and/or four IR sensors. More or less than four IR transmitters and/or four IR sensors can also be used.

Another embodiment for tracking the direction of the eyes is based on charge tracking. This concept is based on the observation that a retina carries a measurable positive charge and the cornea has a negative charge. Sensors are mounted by the user's ears (near earphones 130) to detect the electrical potential while the eyes move around and effectively read out what the eyes are doing in real time. This provides both the position of a user's eyes relative to the head mounted display device, and the position of the user's pupils. Other embodiments for determining the position of the user's eyes relative to the head mounted display device can also be used.

Using any of the above-described embodiments, the eye position and tracking system 134 is able to determine a position of the left and right eyes relative to a position of the eye position and tracking system 134. Using the known position and geometry of the system 134 relative to the optical elements 115, the position of the optical elements 115 relative to the left and right eyes is also known. This position includes a relative position of the eyes and the optical elements along the x-axis (e.g., horizontal positioning). This position includes a relative position of the eyes and optical elements along the y-axis (e.g., vertical positioning). And this position includes a relative position of the eyes and optical elements along the z-axis (e.g., a distance between the eyes and optical elements).

In addition to position, it is also advantageous to determine the angular orientation (pitch, yaw and roll) of the optical elements 115 relative to the left and right eyes. For this purpose, the eye position and tracking assembly 134 also determines a center of each eye, and an eye vector straight out from the center of the eye.

The eye center may be determined a number of ways. Where sensor 134B captures an image of the eye (either as a color image and/or as a depth image), the image may be analyzed to determine the eye center. For example, an image sensor may examine the corneal surface, and from that, determine major axes and the corneal center. In a further embodiment, the image sensor may examine other features of the eyes, including pupil, sclera (white portions of the eye) and/or eye lashes. Other features of the face such as brow, nose and nose bridge may further be imaged and used to determine the centers of the left and right eyes.

Examples including IR transmitters/receivers may also determine the center of the eye and an eye vector straight out from the center. For example, where there are multiple IR transmitters/receivers, such as four, each of these components may measure the amount of sclera in the eye they detect. These four independent values may be determined and compared. When each measures the same amount of sclera in the eye, the eye is centered (looking straight forward), and the eye vector may be taken perpendicularly straight out from the pupil. This position may either be found when each IR transmitter/receiver measure the same amount of sclera in the eye, or it may be extrapolated from a measurement where the four transmitter/receiver pairs measure different values of sclera in the eye.

As noted above, each eye may its own position and tracking assembly 134, and a separate eye vector may be determined for each. Alternatively, it may be assumed that the eyes are symmetric and move together, and a single eye vector may be determined and used for both eyes.

FIG. 3A shows half of the head mounted display device 2. A full head mounted display device would include another set of see-through lenses, another opacity filter, another light-guide optical element, another microdisplay 120, another lens 122, room-facing camera 112, eye position and tracking assembly 134, micro display, earphones, and temperature sensor.

In one embodiment, the display and the opacity filter are rendered simultaneously and are calibrated to a user's precise position in space to compensate for angle-offset issues. Eye tracking (e.g., using eye tracking camera 134) can be employed to compute the correct image offset at the extremities of the viewing field. Eye tracking can also be used to provide data for focusing the front facing camera 113, or another camera. The eye tracking camera 134 and other logic to compute eye vectors are considered to be an eye tracking system, in one embodiment.

Figure 3B:
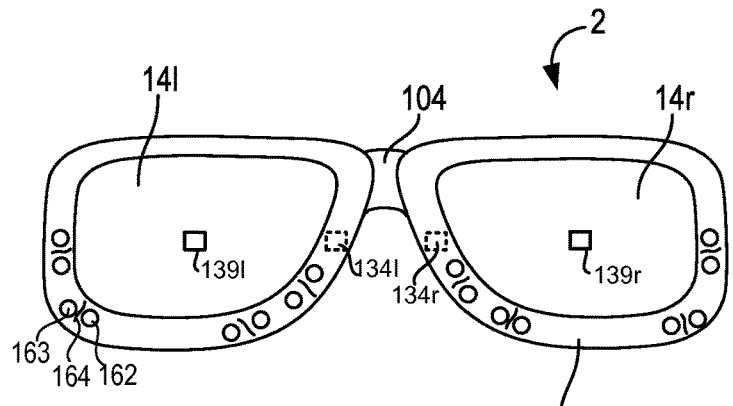
FIG. 3B, FIG. 3C, and FIG. 3D each illustrate exemplary arrangements of positions of respective sets of gaze detection elements in an HMD embodied in a set of eyeglasses.
Figure 4:
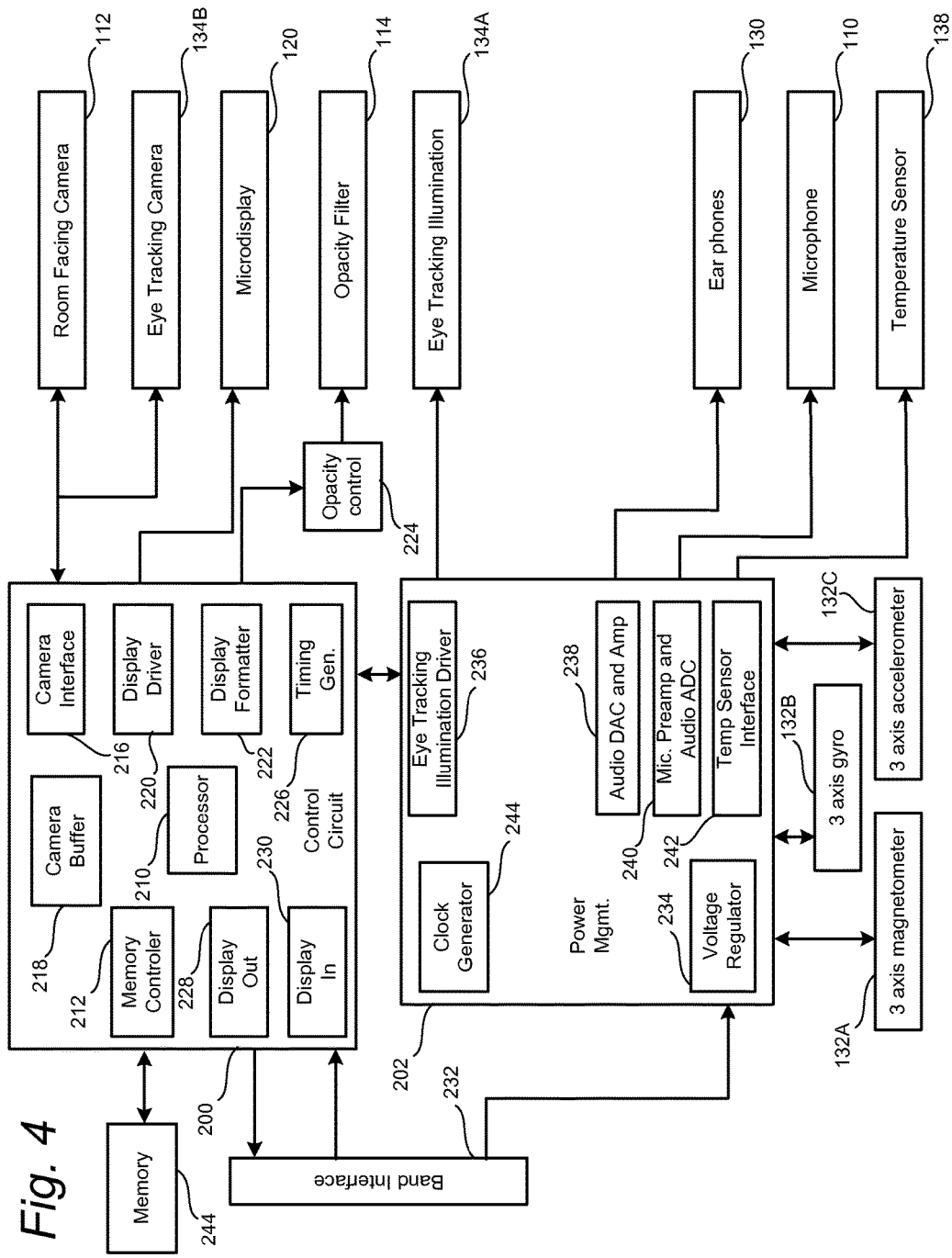
FIG. 4 is a block diagram of one embodiment of the components of a head mounted display unit.

FIG. 3B illustrates an exemplary arrangement of positions of respective sets of gaze detection elements in a HMD 2 embodied in a set of eyeglasses. What appears as a lens for each eye represents a display optical system 14 for each eye, e.g. 14r and 14l. A display optical system includes a see-through lens, as in an ordinary pair of glasses, but also contains optical elements (e.g. mirrors, filters) for seamlessly fusing virtual content with the actual and direct real world view seen through the lens 6. A display optical system 14 has an optical axis which is generally in the center of the see-through lens in which light is generally collimated to provide a distortionless view. For example, when an eye care professional fits an ordinary pair of eyeglasses to a user's face, a goal is that the glasses sit on the user's nose at a position where each pupil is aligned with the center or optical axis of the respective lens resulting in generally collimated light reaching the user's eye for a clear or distortionless view.

In the example of FIG. 3B, a detection area 139r, 139l of at least one sensor is aligned with the optical axis of its respective display optical system 14r, 14l so that the center of the detection area 139r, 139l is capturing light along the optical axis. If the display optical system 14 is aligned with the user's pupil, each detection area 139 of the respective sensor 134 is aligned with the user's pupil. Reflected light of the detection area 139 is transferred via one or more optical elements to the actual image sensor 134 of the camera, in this example illustrated by dashed line as being inside the frame 115.

In one example, a visible light camera also commonly referred to as an RGB camera may be the sensor, and an example of an optical element or light directing element is a visible light reflecting mirror which is partially transmissive and partially reflective. The visible light camera provides image data of the pupil of the user's eye, while IR photodetectors 162 capture glints which are reflections in the IR portion of the spectrum. If a visible light camera is used, reflections of virtual images may appear in the eye data captured by the camera. An image filtering technique may be used to remove the virtual image reflections if desired. An IR camera is not sensitive to the virtual image reflections on the eye.

In one embodiment, the at least one sensor 134 is an IR camera or a position sensitive detector (PSD) to which IR radiation may be directed. For example, a hot reflecting surface may transmit visible light but reflect IR radiation. The IR radiation reflected from the eye may be from incident radiation of the illuminators 153, other IR illuminators (not shown) or from ambient IR radiation reflected off the eye. In some examples, sensor 134 may be a combination of an RGB and an IR camera, and the optical light directing elements may include a visible light reflecting or diverting element and an IR radiation reflecting or diverting element. In some examples, a camera may be small, e.g. 2 millimeters (mm) by 2 mm. An example of such a camera sensor is the Omnivision OV7727. In other examples, the camera may be small enough, e.g. the Omnivision OV7727, e.g. that the image sensor or camera 134 may be centered on the optical axis or other location of the display optical system 14. For example, the camera 134 may be embedded within a lens of the system 14. Additionally, an image filtering technique may be applied to blend the camera into a user field of view to lessen any distraction to the user.

In the example of FIG. 3B, there are four sets of an illuminator 163 paired with a photodetector 162 and separated by a barrier 164 to avoid interference between the incident light generated by the illuminator 163 and the reflected light received at the photodetector 162. To avoid unnecessary clutter in the drawings, drawing numerals are shown with respect to a representative pair. Each illuminator may be an infra-red (IR) illuminator which generates a narrow beam of light at about a predetermined wavelength. Each of the photodetectors may be selected to capture light at about the predetermined wavelength. Infra-red may also include near-infrared. As there can be wavelength drift of an illuminator or photodetector or a small range about a wavelength may be acceptable, the illuminator and photodetector may have a tolerance range about a wavelength for generation and detection. In embodiments where the sensor is an IR camera or IR position sensitive detector (PSD), the photodetectors may be additional data capture devices and may also be used to monitor the operation of the illuminators, e.g. wavelength drift, beam width changes, etc. The photodetectors may also provide glint data with a visible light camera as the sensor 134.

As mentioned above, in some embodiments which calculate a cornea center as part of determining a gaze vector, two glints, and therefore two illuminators will suffice. However, other embodiments may use additional glints in determining a pupil position and hence a gaze vector. As eye data representing the glints is repeatedly captured, for example at 30 frames a second or greater, data for one glint may be blocked by an eyelid or even an eyelash, but data may be gathered by a glint generated by another illuminator.

Figure 3C:
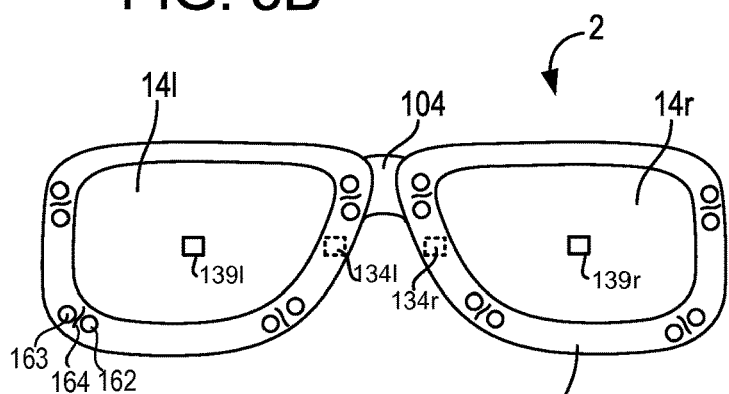

FIG. 3C illustrates another exemplary arrangement of positions of respective sets of gaze detection elements in a set of eyeglasses. In this embodiment, two sets of illuminator 163 and photodetector 162 pairs are positioned near the top of each frame portion 115 surrounding a display optical system 14, and another two sets of illuminator and photodetector pairs are positioned near the bottom of each frame portion 115 for illustrating another example of a geometrical relationship between illuminators and hence the glints they generate. This arrangement of glints may provide more information on a pupil position in the vertical direction.

Figure 3D:
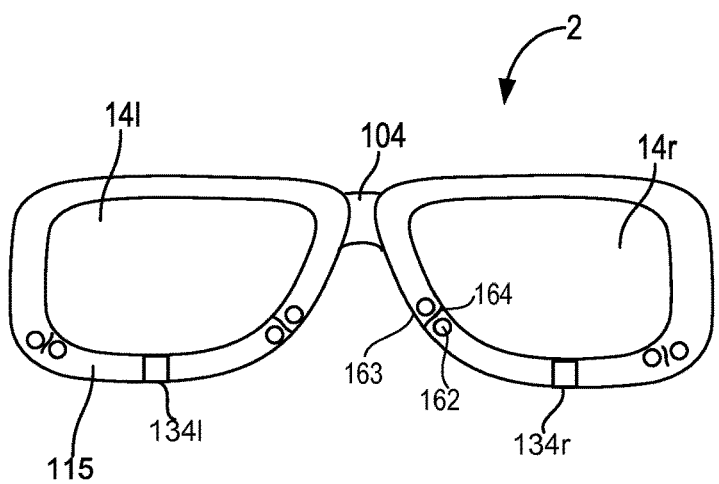

FIG. 3D illustrates yet another exemplary arrangement of positions of respective sets of gaze detection elements. In this example, the sensor 134r, 134l is in line or aligned with the optical axis of its respective display optical system 14r, 14l but located on the frame 115 below the system 14. Additionally, in some embodiments, the camera 134 may be a depth camera or include a depth sensor. A depth camera may be used to track the eye in 3D. In this example, there are two sets of illuminators 153 and photodetectors 152.

Figure 5:
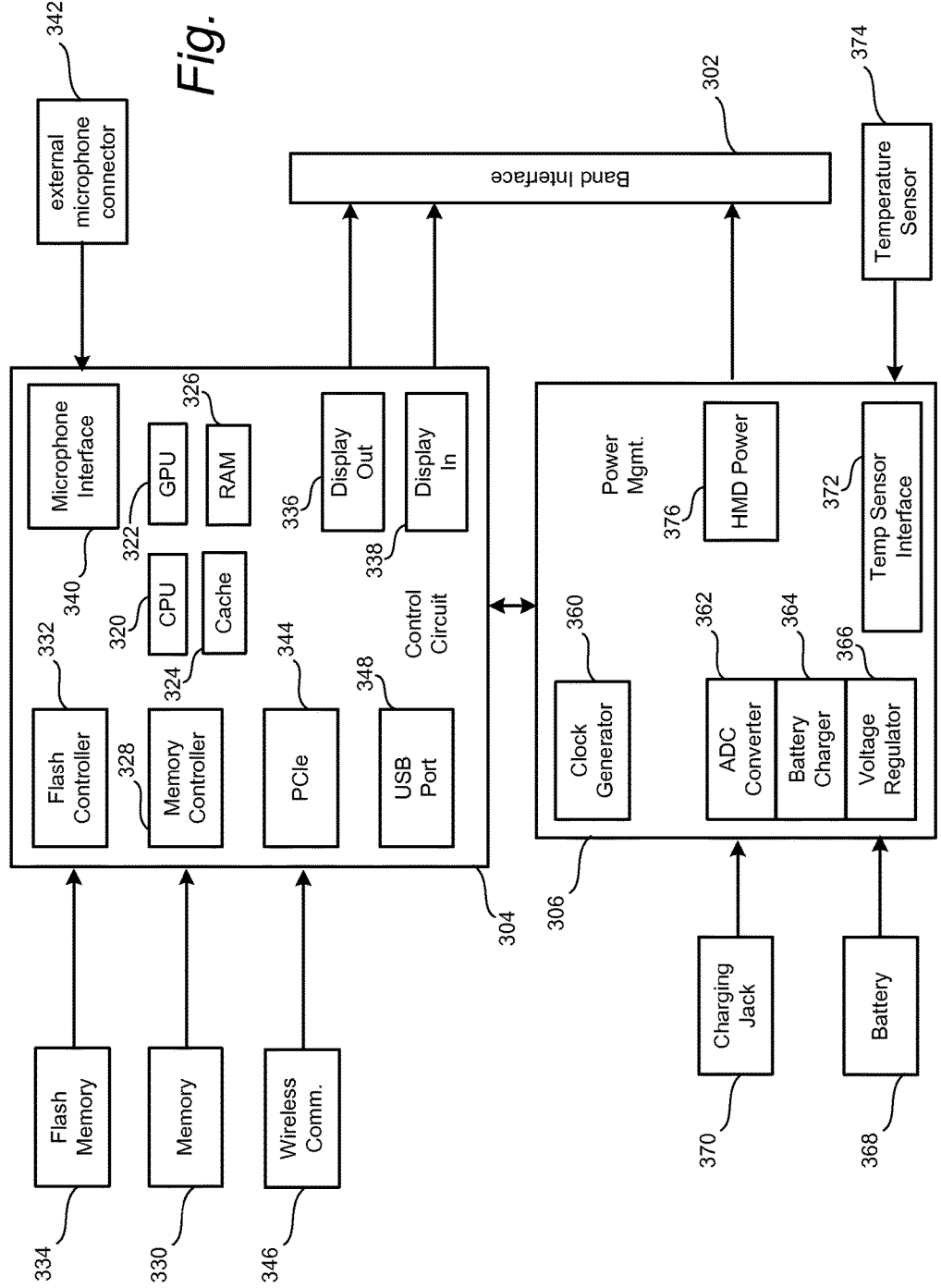
FIG. 5 is a block diagram of one embodiment of the components of a processing unit associated with a head mounted display unit.

FIG. 4 is a block diagram depicting the various components of head mounted display device 2. FIG. 5 is a block diagram describing the various components of processing unit 4. Head mounted display device 2, the components of which are depicted in FIG. 4, is used to provide a mixed reality experience to the user by fusing one or more virtual images seamlessly with the user's view of the real world. Additionally, the head mounted display device components of FIG. 4 include many sensors that track various conditions. Head mounted display device 2 will receive instructions about the virtual image from processing unit 4 and will provide the sensor information back to processing unit 4. Processing unit 4, the components of which are depicted in FIG. 4, will receive the sensory information from head mounted display device 2.

Using that information and possibly information from hub computing system 12, processing unit 4 may determine where and when to provide a virtual image to the user and send instructions accordingly to the head mounted display device of FIG. 4. As explained hereinafter, using information from the eye position and tracking assembly 134, the processing unit 4 may additionally determine a degree to which a camera in the eye position and tracking assembly 134 is focused. This information may be used to generate a proxy image that is presented on the microdisplay 120 (and hence display optical system 14 or various elements 124, 115, 126, etc.). The user may be instructed to focus the proxy image by adjusting a camera focus mechanism. In this manner, the camera may be focused.

Some of the components of FIG. 4 (e.g., room-facing camera 112, eye tracking sensor 134B, microdisplay 120, opacity filter 114, eye tracking illumination 134A, earphones 130, and temperature sensor 138) are shown in shadow to indicate that there are two of each of those devices, one for the left side and one for the right side of head mounted display device 2. FIG. 4 shows the control circuit 200 in communication with the power management circuit 202. Control circuit 200 includes processor 210, memory controller 212 in communication with memory 214 (e.g., D-RAM), camera interface 216, camera buffer 218, display driver 220, display formatter 222, timing generator 226, display out interface 228, and display in interface 230.

In one embodiment, all of the components of control circuit 200 are in communication with each other via dedicated lines or one or more buses. In another embodiment, each of the components of control circuit 200 is in communication with processor 210. Camera interface 216 provides an interface to the two room-facing cameras 112 and stores images received from the room-facing cameras in camera buffer 218. Display driver 220 will drive microdisplay 120. Display formatter 222 provides information, about the virtual image being displayed on microdisplay 120, to opacity control circuit 224, which controls opacity filter 114. Timing generator 226 is used to provide timing data for the system. Display out interface 228 is a buffer for providing images from room-facing cameras 112 to the processing unit 4. Display in interface 230 is a buffer for receiving images such as a virtual image to be displayed on microdisplay 120. Display out interface 228 and display in interface 230 communicate with band interface 232 which is an interface to processing unit 4.

Power management circuit 202 includes voltage regulator 234, eye tracking illumination driver 236, audio DAC and amplifier 238, microphone preamplifier and audio ADC 240, temperature sensor interface 242 and clock generator 244. Voltage regulator 234 receives power from processing unit 4 via band interface 232 and provides that power to the other components of head mounted display device 2. Eye tracking illumination driver 236 provides the IR light source for eye tracking illumination 134A, as described above. Audio DAC and amplifier 238 output audio information to the earphones 130. Microphone preamplifier and audio ADC 240 provides an interface for microphone 110. Temperature sensor interface 242 is an interface for temperature sensor 138. Power management circuit 202 also provides power and receives data back from three axis magnetometer 132A, three axis gyro 132B and three axis accelerometer 132C.

FIG. 5 is a block diagram describing the various components of processing unit 4. FIG. 5 shows control circuit 304 in communication with power management circuit 306. Control circuit 304 includes a central processing unit (CPU) 320, graphics processing unit (GPU) 322, cache 324, RAM 326, memory controller 328 in communication with memory 330 (e.g., D-RAM), flash memory controller 332 in communication with flash memory 334 (or other type of non-volatile storage), display out buffer 336 in communication with head mounted display device 2 via band interface 302 and band interface 232, display in buffer 338 in communication with head mounted display device 2 via band interface 302 and band interface 232, microphone interface 340 in communication with an external microphone connector 342 for connecting to a microphone, PCI express interface for connecting to a wireless communication device 346, and USB port(s) 348. In one embodiment, wireless communication device 346 can include a Wi-Fi enabled communication device, BlueTooth communication device, infrared communication device, etc. The USB port can be used to dock the processing unit 4 to hub computing system 12 in order to load data or software onto processing unit 4, as well as charge the processing unit 4. In one embodiment, CPU 320 and GPU 322 are the main workhorses for determining where, when and how to insert virtual three-dimensional objects into the view of the user. More details are provided below.

Power management circuit 306 includes clock generator 360, analog to digital converter 362, battery charger 364, voltage regulator 366, head mounted display power source 376, and temperature sensor interface 372 in communication with temperature sensor 374 (possibly located on the wrist band of processing unit 4). Analog to digital converter 362 is used to monitor the battery voltage, the temperature sensor and control the battery charging function. Voltage regulator 366 is in communication with battery 368 for supplying power to the system. Battery charger 364 is used to charge battery 368 (via voltage regulator 366) upon receiving power from charging jack 370. HMD power source 376 provides power to the head mounted display device 2.

Figure 6:
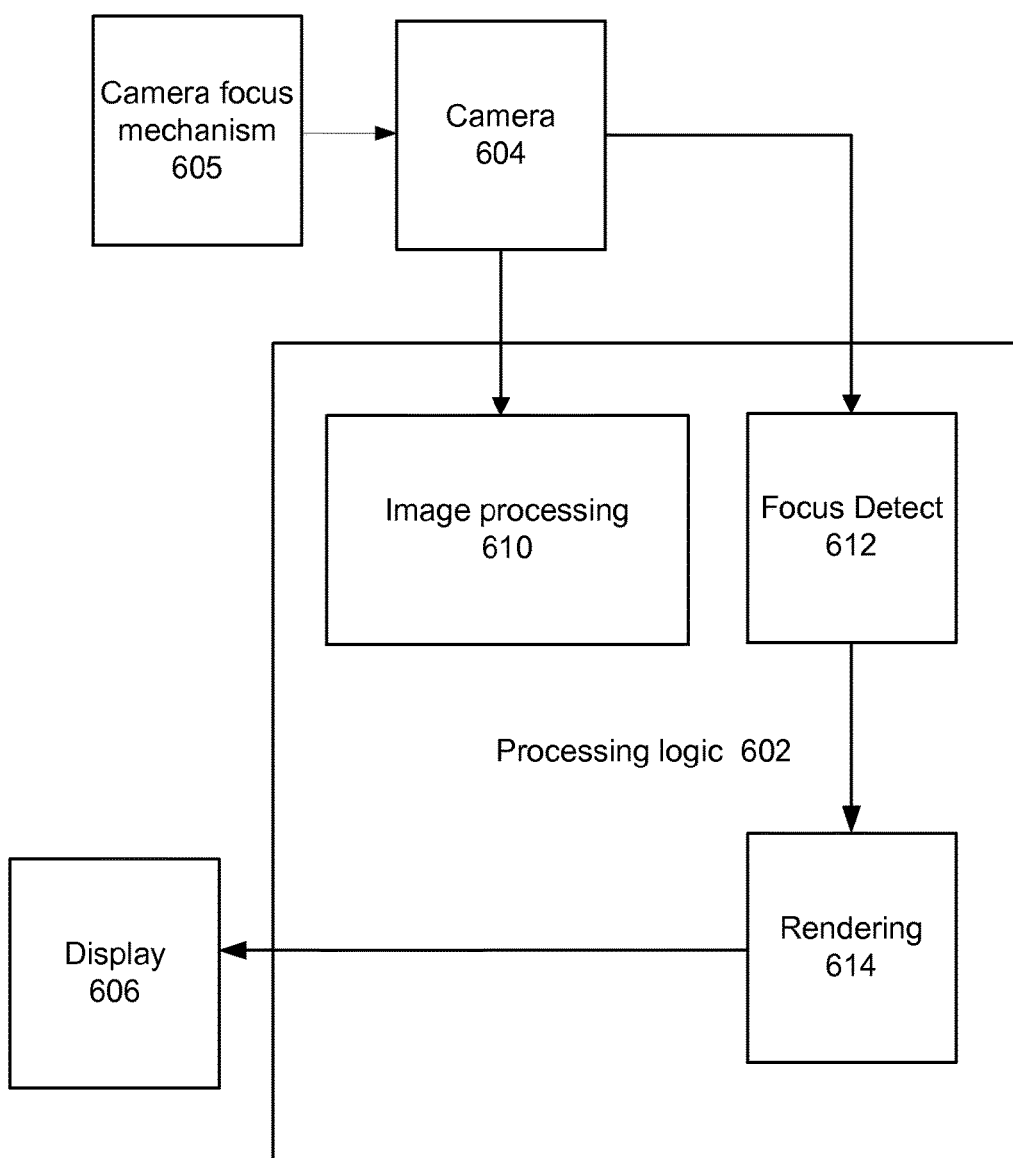
FIG. 6 is a diagram of one embodiment of a system for focusing a camera.

FIG. 6 is a diagram of one embodiment of a system 600 for focusing a camera 604. The system 600 includes a processing logic 602, a camera 604, and a display 606. In one embodiment, the system 600 is part of an HMD 2. The camera 604 could be any of the cameras described herein. In one embodiment, the camera 604 is an IR camera. The camera 604 may be part of the eye position and tracking assembly 134. For example, the camera 604 could be eye tracking camera 134B. The camera 604 might also be room-facing camera 112. The camera to be focused is not limited to these examples.

In one embodiment, the display 606 includes one or more elements of an HMD 2 described herein. For example, display 606 could include microdisplay 120. Also the combination of elements such as the reflecting surface 124, the light-guide optical element 115, selectively reflecting surfaces 126 may be considered to be the display 606. Referring to FIGS. 3B-3D, the display 606 could include display optical system 14. Note that display 606 might include a display for the right eye and a display for the left eye. However, it is not required that there be a separate display for each eye.

The processing logic 602 has a focus detect 612 for detecting the degree to which the camera 604 is focused. The focus detect 612 inputs data that is associated with the camera 604 and can be used to determine the degree to which the camera 604 is focused. This data might be image data from the camera 604. This could be data other than image data, such as data that indicates how far the camera 604 is from an object that the camera 604 is to focus on. The focus detect 612 outputs a signal that indicates the degree to which the camera 604 is focused (or degree to which the camera is "in-focus").

The rendering 614 inputs the signal from the focus detect 612 and generates an image (e.g., "proxy image") that has a degree of blurring that inversely correlates with the degree to which the camera 604 is in focus. Note that this may be an inverse correlation in that there may be less blurring in the proxy image when the camera is more in focus. Stated another way, there may be more blurring in the proxy image when the camera is more out of focus. This "blurred" image is presented on the display 606. In one embodiment, the rendering is implemented on a graphic processing unit (GPU).

The camera focus mechanism 605 allows the camera 604 to be focused. For example, a user is able to manually adjust the camera focus mechanism 605. As one example, the camera 604 might have a focusing lens (in addition to an objective lens of the camera) that is moved to focus the camera 604. However, many other types camera focus mechanisms 605 could be used. For an HMD 2, the user may adjust the distance between their eye(s) and the camera 604 to focus the camera 604. In this example, the camera focus mechanism 605 might be a structure on the HMD that allows the location of the camera to be moved relative to the user's eye, while the user is wearing the HMD 2.

The image processing 610 inputs image data from the camera 604 and performs some kind of processing of the image data. Eye tracking is one example, but the processing could be anything. The processing logic 602, the focus detect 612, the rendering 614, and the image processing 610 could each be implemented in software, hardware, or some combination of software and hardware. Various elements in FIGS. 4 and 5 could be used. For example, the rendering 614 might be performed by GPU (FIG. 5, 322) and the image processing 610 and the focus detect 612 might be performed by CPU (FIG. 5, 320). Processor (FIG. 4, 210) might also be used for the image processing 610, the rendering 614 and/or the focus detect 612. Instructions for executing on the various processors 210, 320, 322 may be stored in memory (e.g., memory 244, 330, 334, cache 324, RAM 326). These are just examples and not intended to be limiting. Also, it is not required that processing logic 602, rendering 614 and/or focus detect 612 are implemented by instructions executed on a processor. For example, an Application Specific Integrated Circuit (ASIC) might be used.

Figure 7:
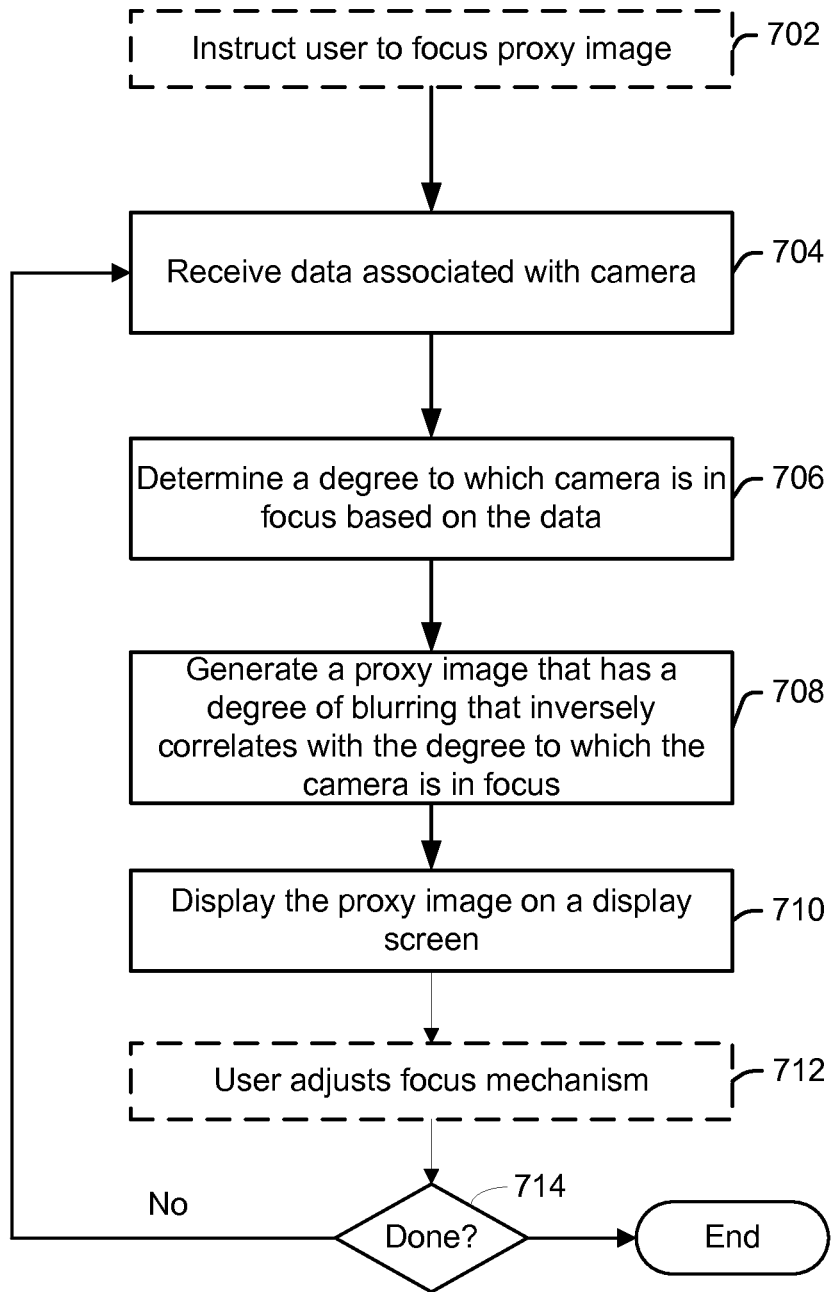
FIG. 7 refers to one embodiment of a process of focusing a camera.

FIG. 7 refers to one embodiment of a process of focusing a camera. This process could be used in system 600 of FIG. 6. Reference will be made to elements in FIG. 6, but the process is not limited to that system 600. This process could be used in an HMD 2, but that is not required. The process is used to focus an infrared camera, in one embodiment. The process could be initiated in numerous ways. One possibility is for the system (e.g., HMD) to determine that a camera needs to be focused and, in response thereto, initiate this process.

This process involves presenting a proxy image to a user. In step 702, the system 600 instructs the user that they are to attempt focus the proxy image during the process. Note that the system 600 may or may not be presenting the proxy image when this instruction is provided. The system 600 may also provide instructions for focusing the proxy image. This instruction may be for the user to adjust a camera focus mechanism to attempt to bring the proxy image into better focus.

In step 704, the system 600 receives data that is associated with the camera 604. In one embodiment, this is image data from the camera 604. For example, it could be an IR image. It is not required that this data be image data from the camera. In one embodiment, this data indicates the distance between the camera 604 and an object that the camera 604 is to be focused on.

In step 706, the system 600 determines a degree to which the camera 604 is focused. In one embodiment, the system 600 determines a degree to which an image from the camera 604 is focused. However, the system 600 might base this determination on information other than the image. For example, this might be based on data that indicates the distance between the camera 604 and an object that the camera is to be focused on.

In step 708, the system 600 generates a proxy image that has a degree of blurring that inversely correlates to the degree to which the camera 604 is in focus. As noted above, this may be an inverse correlation. Stated another way, the degree of blurring in the proxy image correlates to the degree to which the camera 604 is out of focus. Further details are described below.

In step 710, the system 600 displays the proxy image on display 606. This is displayed on am HMD in one embodiment. As noted above, the display 606 could include display optical system 14, microdisplay 120, reflecting surface 124, the light-guide optical element 115, selectively reflecting surfaces 126.

In step 712, the user adjusts a camera focusing mechanism. The user attempts to bring the proxy image into focus. Further details are described below.

In step 714, the system 600 determines whether the camera 604 is adequately focused. If so, the process is complete. Otherwise, the process returns to step 704 to receive additional data associated with the camera 604. Assuming that the user has made an adjustment to the camera focusing mechanism, the system 600 will determine that the degree of camera focus has changed (in step 706). Thus, the proxy image that is generated in step 708 will have its degree of blurring updated such that it inversely correlates to the new degree of camera focus.

Figure 8:
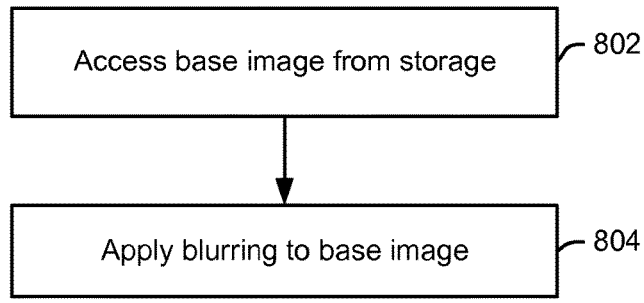
FIG. 8 is a flowchart of one embodiment of a process of generating a proxy image.

FIG. 8 is a flowchart of one embodiment of a process of generating a proxy image. This is one embodiment of step 708 of FIG. 7. Again, reference will be made to elements of FIG. 6, with the understanding that this process is not limited to that system 600. In step 802, the system 600 accesses a base image from processor readable storage. The base image is typically an image that is in the visible spectrum. The content of the base image is not necessarily critical. Since this is going to be shown to the user, this image could be selected based on having good properties to allow the user to focus it. Note that an image that might be generated based directly from an IR camera image might not be suitable for a user to focus. For example, if an IR image would be to shifted in wavelength such that it is visible it might not be easy for a user to focus such an image. For the sake of discussion, FIG. 9A shows an example base image 910 having a plant in a flower pot. Note that this base image 910 is not the image from the camera 604.

In step 804, the system 600 blurs the base image 910 to form a proxy image. For the sake of discussion, FIG. 9B shows an example proxy image 920 that is a blurred version of the base image 910. The blurring is performed by using a mathematical function in one embodiment. A point spread function (PSF) may be used, for example. The PSF may be applied to each pixel in the base image 910, which may serve to spread the light intensity of each respective pixel to neighboring pixels. Then, the results are summed up to produce the proxy image 920. The width of the PSF may be set to cause the desired degree of blurring. Step 804 is performed on a GPU in one embodiment.

As previously discussed, the degree of blurring of the proxy image 920 inversely correlates with the degree of focus of the camera. For example, the more in focus that the camera 604 is, the less blurred the proxy image 920 is. Thus, this may be termed an inverse correlation. Alternatively, it may be stated that the more out of focus the camera 604, the more blurred the proxy image 920.

Figure 9C:
FIG. 9C depicts a graph that represents that the degree of blurring of the proxy image inversely correlates with the degree of focus of the camera.
Figure 9A:
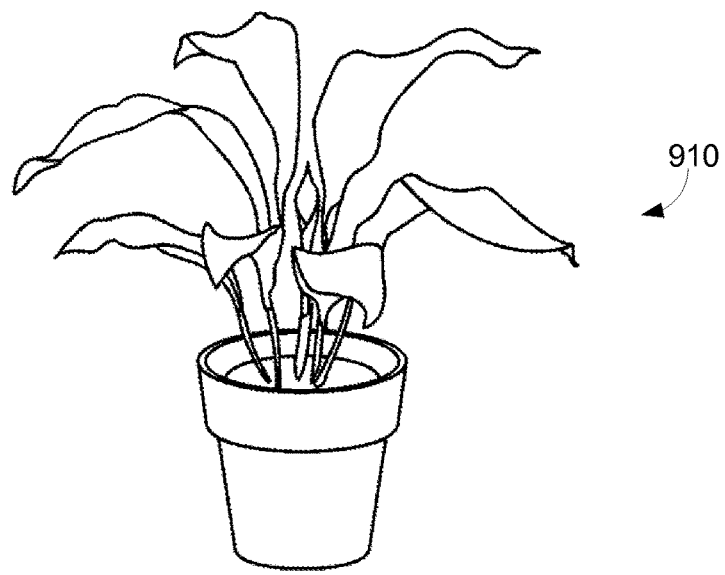
FIG. 9A shows an example base image that may be used in the process of FIG. 8.
Figure 9B:
FIG. 9B shows an example proxy image that may be generated in the process of FIG. 8.

FIG. 9C depicts a graph having a curve 950 that represents that the degree of blurring of the proxy image 920 inversely correlates with the degree of focus of the camera 604. The system 600 might determine a value that represents the degree of camera focus, which may be represented by the x-axis. The system 600 might determine a suitable degree of blurring for the proxy image such that the desired inverse correlation is produced.

Figure 10A:
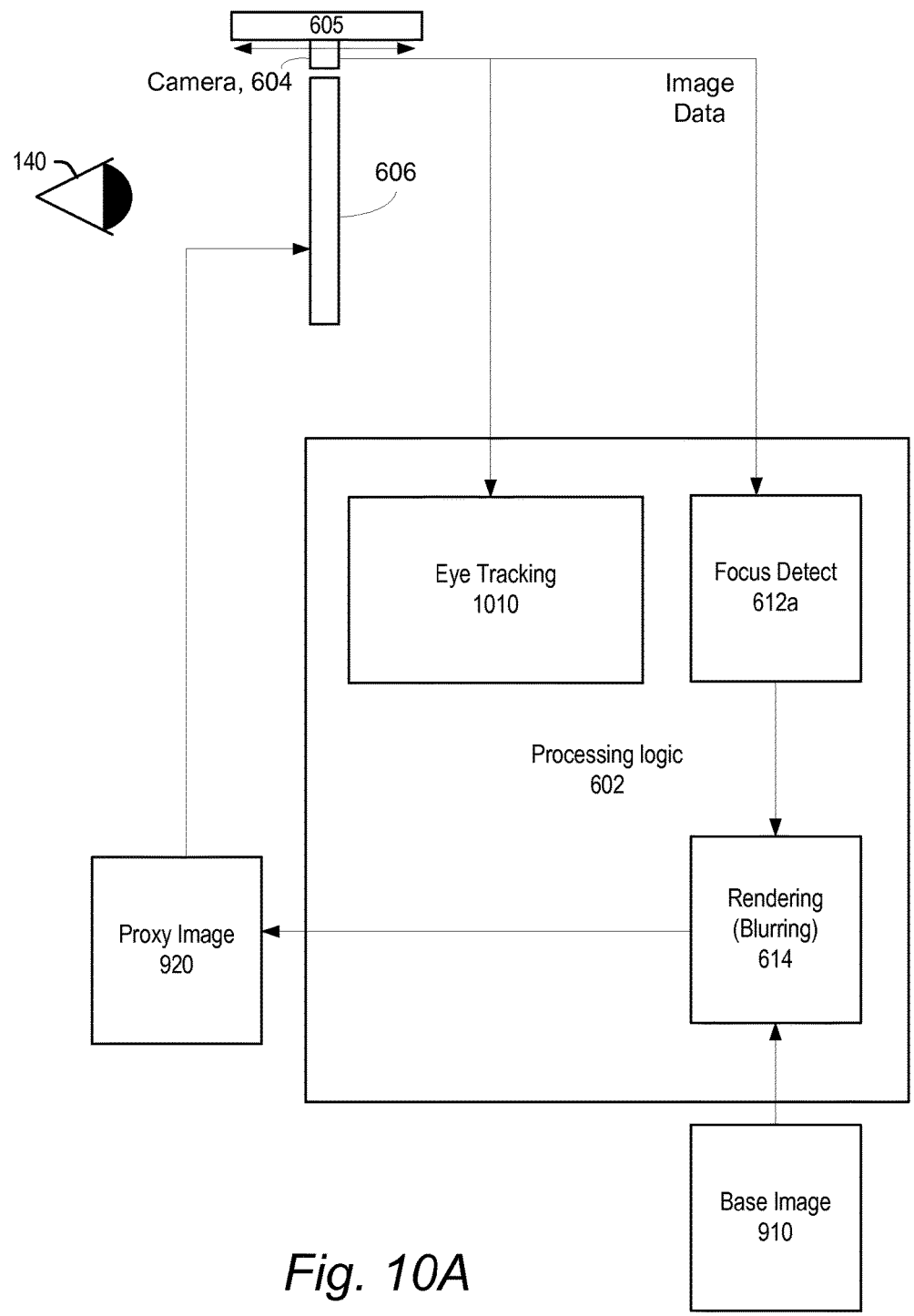
FIG. 10A is a diagram of one embodiment of a system for focusing a camera.

FIG. 10A is a diagram of one embodiment of a system for focusing a camera. This is a variation of the system 600 of FIG. 6 in which the focus detect 612a inputs image data to determine the degree to which the camera 604 is in focus. The image data is IR image data, in one embodiment. For example, the camera 604 captures images in the infrared wavelengths. The system of FIG. 10A may be an HMD 2. Not all elements are depicted as to avoid obscuring the diagram.

The focus detect 612a uses image processing techniques to determine a degree to which the camera image is in focus in one embodiment. There are techniques known to those of ordinary skill in the art for determining a degree to which an image from a camera 604 is in focus. Any convenient technique may be used. For example, contrast detection might be used. Contrast detection measures contrast within the camera image. The intensity difference between adjacent pixels should increase with correct image focus. The optical system can thereby be adjusted until the maximum contrast is detected. Other techniques that analyze the camera image can be used to determine a degree to which the camera image is in focus.

The base image 910 is shown as being input to the rendering 614, which outputs the proxy image 920. The proxy image 920 is presented on display 606. The user (represented by the eye 140) is able to manually adjust a camera focus mechanism 605. For example, the user may adjust the distance between their eye(s) and the camera 604 by moving the camera 604 as indicated by the double arrows along camera focus mechanism 605. Camera focus mechanism 605 could be any structure that allows the distance of the camera 604 to the eye 140 to be adjusted, as one example. Camera focus mechanism 605 could be a structure on the frame of the HMD 2 that allows the camera location relative to the eye to be moved. Other techniques may be used to adjust the focus of the camera 604.

In the example of FIG. 10A, processing logic 602 has eye tracking 1010, which inputs the camera image data. This is one example of the image processing 610 from FIG. 6.

Figure 10B:
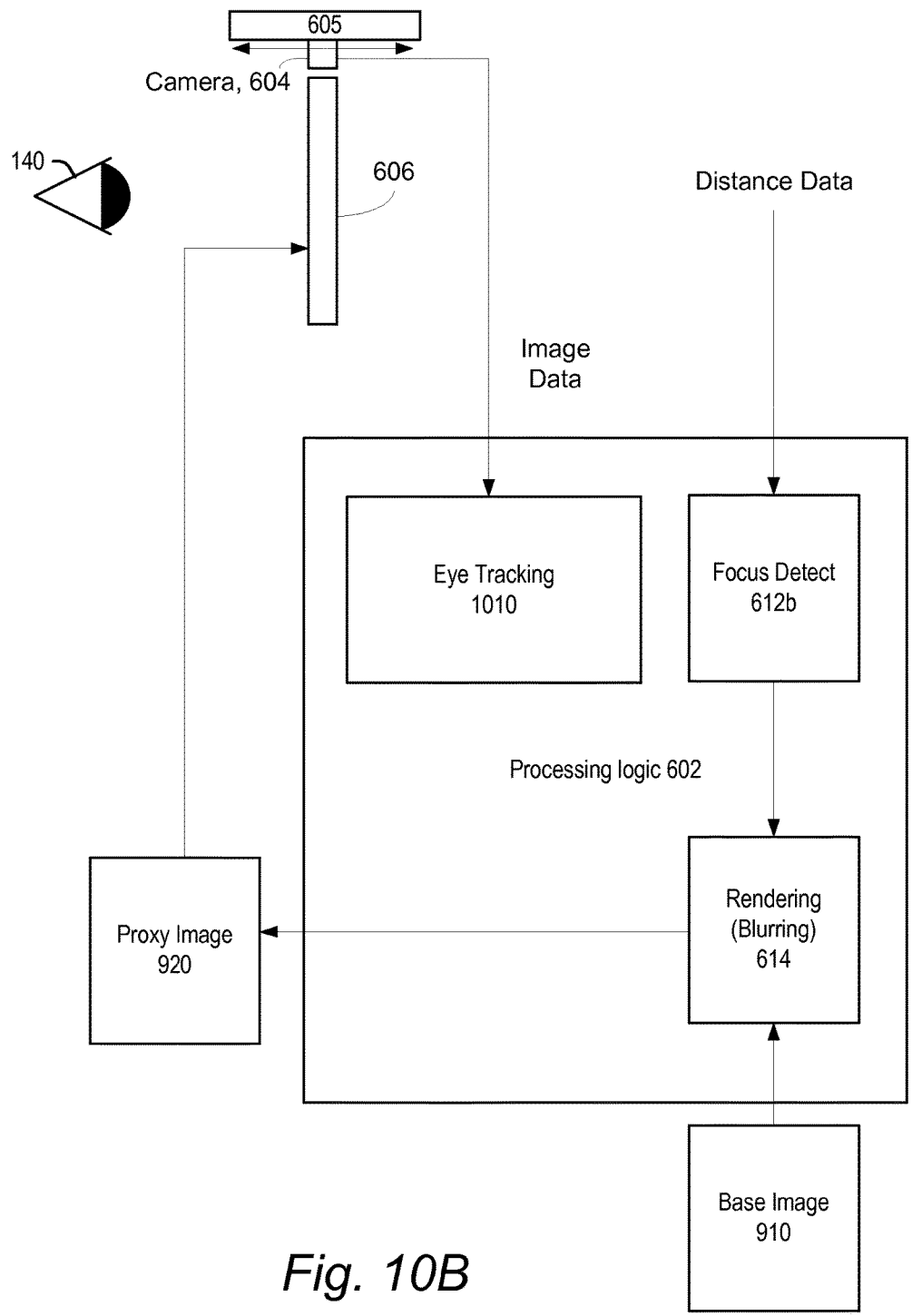
FIG. 10B is a diagram of another embodiment of a system for focusing a camera.

It is not required that the focus detect 612 use image analysis. FIG. 10B is a diagram of one embodiment in which the focus detect 612b distance data to determine the degree to which the camera 604 is in focus. The distance data indicates how far the camera 604 is from an object that it is being focusing upon, in one embodiment. The distance data indicates how far the camera 604 is from the user's eye 140, in one embodiment. The system of FIG. 10A may be an HMD 2. Not all elements are depicted as to avoid obscuring the diagram.

The focus detect 612a may have a target distance at which the camera 604 should be. The focus detect 612a might access a table that has values that associate a degree of focus with each distance, as one example. As another example, the focus detect 612b might employ a mathematical equation to determine the degree of focus based on the input distance and known properties of the camera 604, such as focal length, etc.

The distance data might be provided by the camera 604 itself. For example, the camera 604 might have a range finder that is able to determine a distance between itself and an object to be focused upon. The distance data could be provided by an element other than the camera 604 that is being focused. For example, there might be another camera on the HMD that might be used to determine the distance. Alternatively, the distance data (for the camera on the HMD) may be determined by a device that is not on the HMD, such as another camera nearby.

Figure 11:
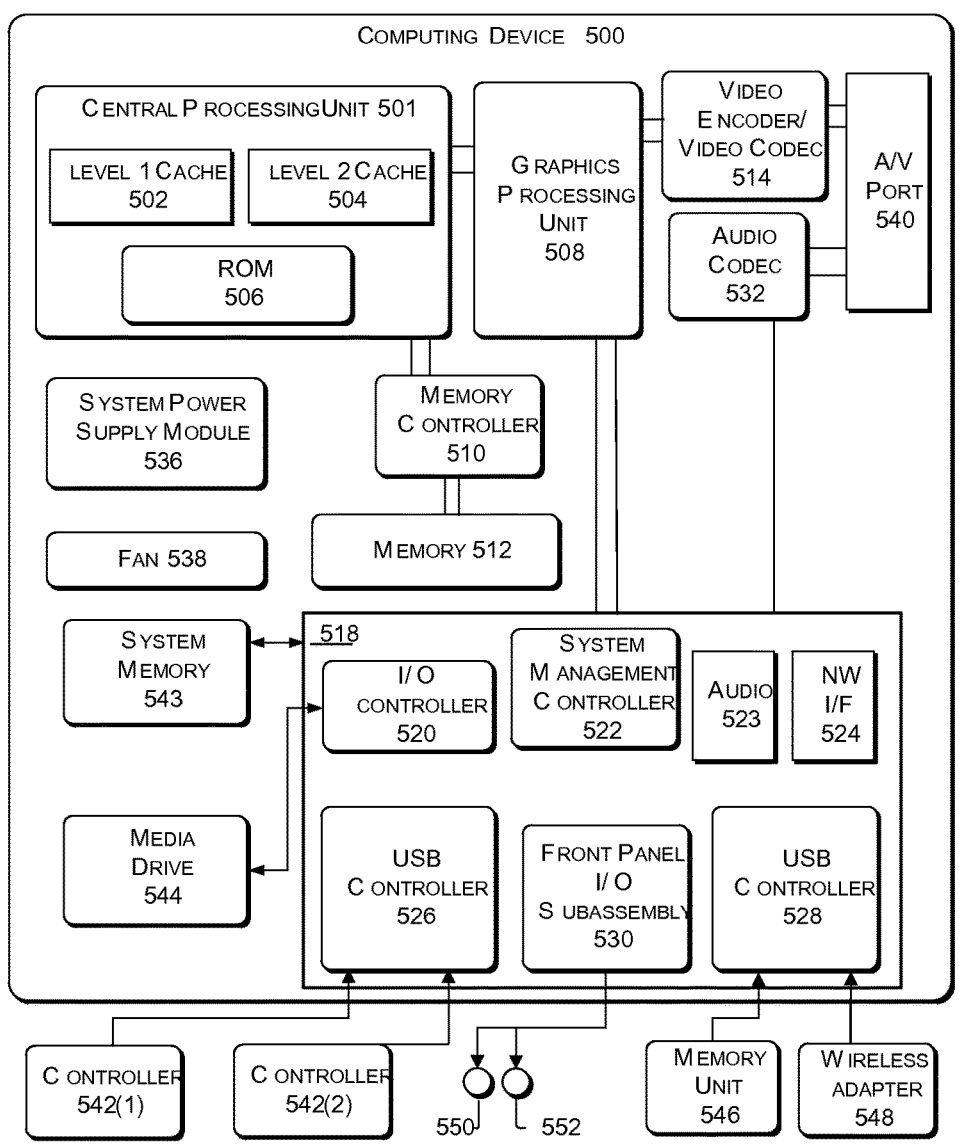
FIG. 11 is a block diagram of one embodiment of a computing system that can be used to implement computing systems described herein.

FIG. 11 illustrates an example embodiment of a computing system that may be used to implement the hub computing system 12 or other processors disclosed herein. As shown in FIG. 11, the computing system 500 has a central processing unit (CPU) 501 having a level 1 cache 502, a level 2 cache 504, and a flash ROM (Read Only Memory) 506. The level 1 cache 502 and a level 2 cache 504 temporarily store data and hence reduce the number of memory access cycles, thereby improving processing speed and throughput. CPU 501 may be provided having more than one core, and thus, additional level 1 and level 2 caches 502 and 504. The flash ROM 506 may store executable code that is loaded during an initial phase of a boot process when the computing device 500 is powered on.

A graphics processing unit (GPU) 508 and a video encoder/video codec (coder/decoder) 514 form a video processing pipeline for high speed and high resolution graphics processing. Data is carried from the graphics processing unit 508 to the video encoder/video codec 514 via a bus. The video processing pipeline outputs data to an A/V (audio/video) port 540 for transmission to a television or other display. A memory controller 510 is connected to the GPU 508 to facilitate processor access to various types of memory 512, such as, but not limited to, a RAM (Random Access Memory).

The computing device 500 includes an I/O controller 520, a system management controller 522, an audio processing unit 523, a network interface 524, a first USB host controller 526, a second USB controller 528 and a front panel I/O subassembly 530 that are preferably implemented on a module 518. The USB controllers 526 and 528 serve as hosts for peripheral controllers 542(1)-542(2), a wireless adapter 548, and an external memory device 546 (e.g., flash memory, external CD/DVD ROM drive, removable media, etc.). The network interface 524 and/or wireless adapter 548 provide access to a network (e.g., the Internet, home network, etc.) and may be any of a wide variety of various wired or wireless adapter components including an Ethernet card, a modem, a Bluetooth module, a cable modem, and the like.

System memory 543 is provided to store application data that is loaded during the boot process. A media drive 544 is provided and may comprise a DVD/CD drive, Blu-Ray drive, hard disk drive, or other removable media drive, etc. The media drive 544 may be internal or external to the computing device 500. Application data may be accessed via the media drive 544 for execution, playback, etc. by the computing device 500. The media drive 544 is connected to the I/O controller 520 via a bus, such as a Serial ATA bus or other high speed connection (e.g., IEEE 1394).

The system management controller 522 provides a variety of service functions related to assuring availability of the computing device 500. The audio processing unit 523 and an audio codec 532 form a corresponding audio processing pipeline with high fidelity and stereo processing. Audio data is carried between the audio processing unit 523 and the audio codec 532 via a communication link. The audio processing pipeline outputs data to the A/V port 540 for reproduction by an external audio user or device having audio capabilities.

The front panel I/O subassembly 530 supports the functionality of the power button 550 and the eject button 552, as well as any LEDs (light emitting diodes) or other indicators exposed on the outer surface of the computing device 500. A system power supply module 536 provides power to the components of the computing device 500. A fan 538 cools the circuitry within the computing device 500.

The CPU 501, GPU 508, memory controller 510, and various other components within the computing device 500 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the computing device 500 is powered on, application data may be loaded from the system memory 543 into memory 512 and/or caches 502, 504 and executed on the CPU 501. The application may present a graphical user interface that provides a consistent user experience when navigating to different media types available on the computing device 500. In operation, applications and/or other media contained within the media drive 544 may be launched or played from the media drive 544 to provide additional functionalities to the computing device 500.

The computing device 500 may be operated as a stand-alone system by simply connecting the system to a television or other display. In this standalone mode, the computing device 500 allows one or more users to interact with the system, watch movies, or listen to music. However, with the integration of broadband connectivity made available through the network interface 524 or the wireless adapter 548, the computing device 500 may further be operated as a participant in a larger network community. Additionally, computing device 500 can communicate with processing unit 4 via wireless adaptor 548.

Optional input devices (e.g., controllers 542(1) and 542 (2)) are shared by gaming applications and system applications. The input devices are not reserved resources, but are to be switched between system applications and the gaming application such that each will have a focus of the device. The application manager preferably controls the switching of input stream, without knowing the gaming application's knowledge and a driver maintains state information regarding focus switches. Capture device 20 may define additional input devices for the device 500 via USB controller 526 or other interface. In other embodiments, hub computing system 12 can be implemented using other hardware architectures. No one hardware architecture is required.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

What is claimed is:

1. An apparatus comprising:
   a display;
   a camera; and
   processing logic in communication with the display and the camera, the processing logic configured to:
      receive image data associated with the camera;
      determine a degree to which the camera is in focus based on the image data;
      blur a visible base image having content that is independent of content in the image data from the camera to generate a proxy image that has a same degree of blurring across an entirety of the proxy image that inversely correlates with the degree to which the camera is in focus;
      display the proxy image on the display; and
      instruct a user to adjust a camera focus mechanism to better focus the proxy image,
   wherein the processing logic receives updated image data associated with the camera after displaying the proxy image, determines a new degree to which the camera is in focus, modifies the degree of blurring of the proxy image to inversely correlate with new degree to which the camera is in focus, and displays an updated proxy image based on the modified degree of blurring.

2. The apparatus of claim 1, wherein the image data associated with the camera that the processing logic receives is the image from the camera, the processing logic determines a degree to which the camera is in focus based on a degree to which the image is in focus.

3. The apparatus of claim 2, wherein the image from the camera is an infrared (IR) image.

4. The apparatus of claim 1, wherein the image data associated with the camera that is received by the processing logic includes a distance that the camera is from an object; the processing logic determines a degree to which the camera is in focus based on the distance.

5. The apparatus of claim 1, wherein the display is a near-eye, see-through display, the apparatus is a head mounted display (HMD), the camera is focused on a user that is wearing the HMD.

6. The apparatus of claim 1, further comprising a graphics processing unit (GPU), the processing logic blurs the visible base image to create the proxy image on the GPU.

7. The apparatus of claim 1, wherein the processing logic is further configured to:
   continue to update the degree of blurring in the displayed proxy image responsive to changes in the degree to which the camera is in focus until the camera is focused to an adequate degree.

8. The apparatus of claim 2, wherein the processing logic is configured to blur the same visible base image regardless of the image from the camera.

9. The apparatus of claim 1, wherein the visible base image is blurred according to the same degree based on a function across each pixel in the visible base image.

10. A method comprising:
   receiving image data associated with a camera;
   determining a degree to which the camera is in focus based on the received image data;
   accessing a visible base image from processor readable storage, wherein the visible base image has content that does not match content in an image from the camera;
   blurring the visible base image to generate a proxy image that has a same degree of blurring across an entirety of the proxy image that inversely correlates with the degree to which the camera is in focus;

displaying the proxy image on a display;

instructing a user to adjust a focus mechanism that is configured to focus the camera to bring the proxy image into better focus;

repeating said receiving, determining, blurring, and displaying until the camera is focused to an adequate degree, including receiving updated image data associated with the camera, determining a new degree to which the camera is in focus, modifying the degree of blurring of the proxy image to inversely correlate with the new degree to which the camera is in focus, and displaying the modified proxy image on the display.

11. The method of claim 10, wherein the receiving the image data associated with a camera includes receiving the image from the camera;

and wherein the determining a degree to which the camera is in focus based on the image data includes determining a degree to which the received image is in focus.

12. The method of claim 11, wherein the image from the camera is an infrared (IR) image.

13. The method of claim 10, wherein the receiving the image data associated with a camera includes receiving data that indicates a distance that the camera is from an object;

and wherein the determining a degree to which the camera is in focus includes determining a degree to which the camera is in focus based on the distance.

14. The method of claim 10, wherein the blurring the visible base image that is to generate a proxy image that has a degree of blurring that correlates with the degree to which the camera is in focus comprises:

mathematically blurring the visible base image to create the proxy image, wherein the same visible base image is blurred regardless of the data received associated with the camera.

15. The method of claim 14, wherein the mathematically blurring the visible base image to create the proxy image comprises using graphics image processing on a graphics processing unit (GPU).

16. The method of claim 10, wherein the displaying the proxy image on a display comprises:

displaying the proxy image on a display of a head mounted display (HMD).

17. A head mounted display (HMD), comprising:

a near-eye, see-through display;

an infrared (IR) camera;

processor readable storage;

an IR camera focus mechanism configured to focus the IR camera; and a processor in communication with the infrared camera and the near-eye, see-through display, the processor configured to:

receive an infrared image from the IR camera;

determine a degree to which the infrared image is out of focus;

access a visible base image from the processor readable storage, wherein the visible base image is an image other than an image from the IR camera and has content that does not match content in the image from the IR camera;

blur the visible base image to create a proxy image that has a same degree of blurring across an entirety of the proxy image that correlates with the degree to which the infrared image is out of focus;

display the blurred proxy image on the near-eye, see-through display; and determine whether the IR camera is adequately focused responsive to a change in the IR camera focus mechanism after the blurred proxy image is displayed, wherein the processor is further configured to receive updated image data associated with the IR camera after displaying the proxy image, determine a new degree to which the IR camera is in focus, modify the degree of blurring of the proxy image to inversely correlate with new degree to which the IR camera is in focus, and display an updated proxy image based on the modified degree of blurring.

18. The head mounted display of claim 17, wherein the processor is further configured to instruct a user to manually adjust the camera focus mechanism to better focus the proxy image.

19. The head mounted display of claim 18, wherein the IR camera is an eye tracking camera on the HMD.

20. The head mounted display of claim 17, further comprising a graphics processing unit (GPU), the processor mathematically blurs the visible base image to create the proxy image using the GPU.

* * * * *